Patented Oct. 3, 1944

2,359,503

UNITED STATES PATENT OFFICE 2,359,503

METHODS OF PRODUCING EMULSIONS OF THE OIL IN WATER TYPE

Kurt Olof Alsmark, Landskrona, Sweden

No Drawing. Application May 24, 1943, Serial No. 488,238. In Sweden May 30, 1942

11 Claims. (Cl. 252—49.3)

This invention relates to the production of so called soluble oils or emulsions which are of the oil in water type and, consequently, are dilutable with water.

It is known that emulsions of this type, which are used as cooling lubricants for metal-cutting tools, and possibly also for other purposes, can be produced by saponifying oily materials such as talloil or talloil acids as well as animal and vegetable oils such as whale oil and rape oil through heating with alkali and water. The emulsions thus produced have a more or less cream-like appearance, i. e., they are not clear or transparent, and their stability is not always such as might be desired.

One object of this invention is to provide an improved saponification process for the production of emulsions of the oil in water type, whereby the emulsions obtained will be clear and transparent as well as especially stable.

A further object of this invention is to provide an improved saponification process for the production of emulsions of the oil in water type, whereby emulsions of this type that are especially stable and can be diluted with water to a high degree for use as cooling lubricants when cutting, abrading and grinding metals, can be produced not only from talloil, or talloil acids, or animal or vegetable oils, but also from mineral oils.

With these and other objects in view, which will become apparent from the following description, the invention consists principally in applying the saponification process to an oily material having an acid value of not less than about 70, and in carrying out the saponification process in two steps intermediated by an addition of water, the first of said steps being carried out at relatively high temperature of about 100° C. and comprising an addition to said oily material of only part of the total quantity of alkali necessary for the neutralization of all the free acids of said oily material, and the second step being carried out at a relatively lower temperature of about 50° C. and comprising an addition of the rest of said total quantity of alkali after the intermediate addition of water.

Clear and transparent as well as especially stable emulsions of the oil in water type have expectedly proved to be obtainable in this way. The emulsions may become so stable that they can stand being frozen into a solid state and then thawed again, and even being considerably heated, without being spoilt. This especially high stability is of great importance for the storage, transport and use of the emulsions as cutting lubricants and for other purposes.

Emulsions produced according to this invention have proved to have a very high grade of dispersion in their dispersive phase, and it is obviously due to this high grade of dispersion that the emulsions are clear and transparent as well as especially stable.

An inconvenience connected with the use of talloil or talloil acids for the production of emulsions by saponification with alkali and for use as cutting lubricants, viz., that the emulsions produced are desiccative and become pitchy or sticky during use, has proved to be avoidable by crack distilling the talloil or talloil acids before the saponification. By crack distillation of talloil or talloil acids the acid value thereof is decreased, but for avoiding the said inconvenience it has been found sufficient to crack distil the talloil or talloil acids so gently that the distillate still has a sufficiently high acid value (not less than about 70) that the distillate can be subjected to the saponification process according to this invention with the desired result. Thus, by crack distilling the talloil or talloil acids and then subjecting same to saponification according to the method of this invention for the production of an emulsion for use as a cutting lubricant, two advantages are gained, first, the lubricant becomes clear and stable, and, secondly, the lubricant does not become desiccative or pitchy or sticky during use.

The method according to this invention is also applicable to oily materials other than talloil and talloil acids. It can be applied to animal oils (e. g., whale oil) as well as vegetable oils (e. g., rape oil) of such sort, or prepared in such a way, that their acid value is at least 70. When applying the method according to this invention to rape oil for example, the rape oil may be subjected to a preparatory treatment comprising such a high heating by which the rape oil is decomposed and its acid value increased to at least about 70. The method according to this invention may also be applied to mineral oils and tar oils as well as animal or vegetable oils with too low an acid value, provided that such oils are incorporated with animal or vegetable oils of a high acid value, or with fatty acids such as olein or talloil fatty acids, or with other saponifiable acids, in such proportions that the resulting composition or oil-mixture has an acid value of at least about 70.

Either potassium hydroxide or sodium hydroxide may be used as alkali in the saponification process, but potassium hydroxide is preferable to sodium hydroxide. When sodium hydroxide is used, soaps may be formed that are insoluble at normal temperature and at such temperature precipitate in flocculent form. On removal of this precipitation, however, a product is obtained that is clear even at normal temperature, but the said product in such a case is much thinner than that obtained when potassium hydroxide is used. Also volatile alkali (ammonia) may be used, but on account of the volatility of ammonia the product becomes labile when stored or used under such circumstances as permit the ammonia to volatize, for which reason volatile alkali cannot be advantageously used for most practical purposes.

It has been found advantageous to add small quantities of salts, especially phosphates, e. g., sodium diphosphate, which have proved to better the qualities of the product as a cooling lubricant in cutting, abrading and grinding metals.

The following is an example of the practical performance of the process.

The oily material (talloil, talloil acids, animal or vegetable oil or oil-mixture) is carefully heated up to 100°-110° C. First only part, e. g., 60% of the total quantity of an aqueous solution of alkali necessary for the neutralization of all the free acids in the oily material, is heated to a like temperature and vigorously stirred into the oily material gradually or in small portions for partially neutralizing the free acids in the mass. When the ensuing reaction stops, a suitable quantity of water, heated up to about 80° C. and preferably softened, is added gradually or successively whilst stirring the mass. The more the said water is added, the thicker becomes the consistency of the mass, the mass assuming a cream-like appearance. A small quantity of sodium diphosphate or other suitable salt dissolved in water is now added.

After the solution of the sodium diphosphate has also been stirred into the mass, the latter is allowed to cool down to a temperature between 50° and 55° C. Into this mass, which has the water as its dispersive phase and therefore is insoluble in water, is vigorously stirred the rest of said quantity of alkali, dissolved in water and of normal temperature, for completely neutralizing the rest of the free acids in the mass.

The last-mentioned addition of alkali forming the second step of the saponification process, must be performed very carefully. After the addition of a certain amount of this alkali, the mass again changes its physical structure, thereby becoming semi-transparent and glazy. On further addition of alkali the mass passes into a very thick and plastic, viscous but transparent, state in which state it is still insoluble in water. When still more alkali is added, the viscous mass passes into a relatively watery, somewhat milky liquid having the oil as its dispersive phase and therefore soluble in water. On still further addition of alkali the liquid becomes quite clear and transparent or only a shade opalescent. During all the successive additions of alkali throughout the second step of the saponification process great care must be taken, after each addition of a small portion of alkali, that the mass is completely homogeneous before the next small portion of alkali is added.

The addition of the sodium diphosphate does not disturb the saponification process, but due consideration must of course be given to the alkalinity of the salt, i. e., its effect on the pH value of the solution, when calculating the quantity of alkali to be used. In order to obtain a good result it is of importance that the process of production be carried out in such a way that the final product may have a pH value between 8 and 9, preferably 8.5 or thereabout.

The following more specified examples may serve to illustrate the invention more in detail.

*Example 1.*—By weight four parts of distillate obtained from talloil or talloil acids by crack distillation and with an acid value of 96.6 and, if desired, with a small addition of perfume, are heated to a temperature of 100°-107° C. By weight 0.4 part of a 47% aqueous solution of potassium hydroxide is heated to approximately the same temperature, and gradually but vigorously stirred into the heated distillate, after which by weight 5 parts softened water heated to 80° C. are similarly vigorously stirred in. A thick cream-like mass now results. After, or during, the addition of the water, by weight 0.1 part sodium diphosphate dissolved in water (the water) is added. After the temperature has fallen to about 50° C. a quantity of alkali necessary for the complete neutralization of the rest of the free acids, namely by weight about 0.3 part of a 47% aqueous solution of potassium hydroxide at normal temperature is carefully stirred in. The cream-like mass now finally passes into a clear and transparent liquid, which when used as a cooling lubricant can be diluted with a relatively high proportion of water, retaining, nevertheless, a sufficient amount of its lubricatory, cooling and rust-preventive qualities.

*Example 2.*—A mixture of 2.50 kg. spindle oil or other mineral oil and 1.5 kg. olein is heated to a temperature of about 100° C., and into this mixture is vigorously stirred, in small doses, 0.30 kg. of a 47% aqueous solution of potassium hydroxide heated to a similar temperature. Thereafter is similarly stirred in 5.46 kg. warm water (preferably soft), and during or after this addition of water, 0.10 kg. sodium diphosphate is added. After the mass has then been allowed to cool down to about 50° C., 0.17 kg. of a 47% aqueous solution of potassium hydroxide is carefully added during vigorous stirring. The emulsion resulting therefrom is clear and extremely stable. In this example it is unnecessary to perfume the product for the purposes for which it is generally used. On account of the fact that soaps of the oleic acid are inclined to mildew, it is however advisable to incorporate an addition of sodium benzoate or other preservative. The emulsion obtained can be diluted still more than that obtained by Example 1.

*Example 3.*—A mixture of 2.4 kg. mineral oil and 1.6 kg. talloil acids are heated to a temperature of about 100° C. 0.3 kg. of a 47% aqueous solution of potassium hydroxide heated to approximately the same temperature is stirred into the heated oil-mixture in small doses and during vigorous stirring. Thereafter 5.6 kg. warm water is similarly vigorously stirred in, and during or after the addition of the water 0.1 kg. sodium diphosphate is added. After the temperature of the mass has fallen to about 50° C., 0.17 kg. of a 47% aqueous solution of potassium hydroxide is carefully but vigorously stirred in. On some suitable occasion during or even after the process of the production 0.001 kg. of a suitable perfume is added.

What I claim and desire to secure by Letters Patent is:

1. The method of producing emulsions of the oil in water type, which comprises subjecting an emulsifiable oily material having an acid value of not less than about 70 to saponification with alkali and carrying out the saponification process in two steps intermediated by an addition of water, the first of said steps being carried out at a relatively high temperature of about .0° C. and comprising an addition to said oily material of only part of the total quantity of alkali necessary for the neutralization of all the free acids of said oily material, and the second step being carried out at a relatively lower temperature of about 50° C. and comprising an addition of the rest of said total quantity of alkali after the intermediate addition of water.

2. The method of producing emulsions of the oil in water type, which comprises subjecting an emulsifiable oily material having an acid value of not less than about 70 to saponification with alkali and carrying out the saponification process in two steps intermediated by an addition of water, the first of said steps being carried out at a relatively high temperature of about 100° C. and comprising a partial neutralization of the free acids of said oily material by an addition of alkali, and the second step being carried out at a relatively lower temperature of about 50° C. and comprising neutralization of the rest of the free acids of said oily material by a further addition of alkali after said intermediate addition of water, and of such an amount as to adjust the pH of the resulting product to a value of between 8 and 9.

3. The method of producing emulsions of the oil in water type, which comprises subjecting an emulsifiable oily material having an acid value of not less than about 70 to saponification with alkali and carrying out the saponification process in two steps intermediated by an addition of water, the first of said steps being carried out at a relatively high temperature of about 100° C. and comprising a partial neutralization of the free acids of said oily material by an addition of alkali, and the second step being carried out at a relatively lower temperature of about 50° C. and comprising neutralization of the rest of the free acids of said oily material by a further addition of alkali after the intermediate addition of water, and of such an amount as to adjust the pH of the resulting product to a value approximating 8.5.

4. The method of producing emulsions of the oil in water type, which comprises mixing mineral oils with oils of such high content of free fatty acids as to obtain an oil-mixture having an acid value of not less than about 70, subjecting said oil-mixture to saponification with alkali, and carrying out the saponification process in two steps intermediated by an addition of water, the first of said steps being carried out at a relatively high temperature of about 100° C. and comprising a partial neutralization of the free acids of said oil-mixture by an addition of alkali, the second step being carried out at a relatively low temperature of about 50° C. and comprising neutralization of the rest of the free acids of said oil-mixture by a further addition of alkali after the interrupting addition of water, and in such an amount as to adjust the pH of the resulting product to a value of between 8 and 9.

5. The method of producing emulsions of the oil in water type, which comprises mixing a mineral lubricating oil with olein so as to obtain an oil-mixture having an acid value of not less than about 70, subjecting said oil-mixture to saponification with alkali, and carrying out the saponification process in two steps intermediated by an addition of water, the first of said steps being carried out at a relatively high temperature of about 100° C. and comprising a partial neutralization of the free acids of said oil-mixture by an addition of alkali, and the second step being carried out at a relatively lower temperature of about 50° C. and comprising neutralization of the rest of the free acids of said oil-mixture by a further addition of alkali after the intermediate addition of water, and of such an amount as to adjust the pH of the resulting product to a value of between 8 and 9.

6. The method of producing emulsions of the oil in water type, which comprises mixing a mineral lubricating oil with talloil acids so as to obtain an oil-mixture having an acid value of not less than about 70, subjecting said oil-mixture to saponification with alkali, and carrying out the saponification process in two steps intermediated by an addition of water, the first of said steps being carried out at a relatively high temperature of about 100° C. and comprising a partial neutralization of the free acids of said oil-mixture by an addition of alkali, and the second step being carried out at a relatively low temperature of about 50° C. and comprising neutralization of the rest of the free acids of said oil-mixture by a further addition of alkali after the intermediate addition of water, and in such an amount as to adjust the pH of the resulting product to a value of between 8 and 9.

7. The method of producing emulsions of the oil in water type, which comprises subjecting rape oil to a heat treatment so as to increase its acid value to at least about 70, then subjecting said oil to saponification with alkali and carrying out the saponification process in two steps intermediated by an addition of water, the first of said steps being carried out at a relatively high temperature of about 100° C. and comprising a partial neutralization of the free acids of the oil by an addition of alkali, and the second step being carried out at a relatively low temperature of about 50° C. and comprising neutralization of the rest of the free acids of the oil by a further addition of alkali after said intermediate addition of water, and of such an amount as to adjust the pH of the resulting product to a value of between 8 and 9.

8. The method as claimed in claim 1, in which an amount of inorganic water-soluble alkali phosphate of the order of about 1% of the reactant material is added to the oily material during the saponification process.

9. The method as claimed in claim 2, in which a small amount of sodium diphosphate is added to the oily material during the saponification process.

10. The method of producing emulsions of the oil in water type, which comprises subjecting tall oil to such crack distillation whereby the acid value thereof is reduced, but not below 70, and then subjecting the tall oil to saponification with alkali and carrying out the saponification process in two steps intermediated by an addition of water, the first of said steps being carried out at a relatively high temperature and comprising a partial neutralization of the free acids of the tall oil, and the second step being carried out at a relatively low temperature of about 50° C. and comprising neutralization of the rest of the free acids of the tall oil by a further addition of alkali after said intermediate addition of water, and in such an amount as to adjust the pH of the resulting product to a value of between 8 and 9.

11. The method as claimed in claim 1, in which about 60% of the said total quantity of alkali is added to the oily material during the first step of the saponification process.

KURT OLOF ALSMARK.